(12) United States Patent
Berens et al.

(10) Patent No.: US 8,774,728 B2
(45) Date of Patent: Jul. 8, 2014

(54) METHOD FOR MANAGING THE OPERATION OF A WIRELESS DEVICE, IN PARTICULAR FOR REDUCING INTERFERENCES WITH A POTENTIAL VICTIM DEVICE

(75) Inventors: Friedbert Berens, Geneva (CH); Eric Achkar, Saint Julien en Genevois (FR)

(73) Assignee: STMicroelectronics N.V., Amsterdam (NL)

( * ) Notice: Subject to any disclaimer, the term of this patent is extended or adjusted under 35 U.S.C. 154(b) by 1264 days.

(21) Appl. No.: 12/128,716

(22) Filed: May 29, 2008

(65) Prior Publication Data

US 2008/0297415 A1 Dec. 4, 2008

(30) Foreign Application Priority Data

Jun. 4, 2007 (EP) .................................... 07109527

(51) Int. Cl.
*H04B 17/00* (2006.01)
(52) U.S. Cl.
USPC ................ 455/67.13; 455/63.1; 455/114.2; 455/101; 342/372; 375/135; 375/260
(58) Field of Classification Search
USPC ......... 455/67.13, 63.1, 63.4, 114.2, 501, 101, 455/27.1; 375/135, 260, 130, E01.001; 343/834, 860, 893, 876, 872; 342/372
See application file for complete search history.

(56) References Cited

U.S. PATENT DOCUMENTS

| | | | | |
|---|---|---|---|---|
| 5,754,138 A * | 5/1998 | Turcotte et al. | ............... | 342/373 |
| 6,359,923 B1 * | 3/2002 | Agee et al. | ............... | 375/130 |
| 7,432,856 B1 * | 10/2008 | Hornbostel et al. | ........... | 342/372 |
| 7,460,615 B2 * | 12/2008 | Kunysz et al. | ................ | 375/316 |
| 7,567,786 B2 * | 7/2009 | Bjerede | ........................ | 455/196.1 |
| 7,639,984 B2 * | 12/2009 | Uwano et al. | ................. | 455/63.1 |
| 7,706,828 B2 * | 4/2010 | Cleveland | ....................... | 455/522 |
| 8,098,198 B2 * | 1/2012 | Thiesen et al. | ................. | 342/372 |
| 8,116,819 B2 * | 2/2012 | Niu et al. | .................... | 455/562.1 |
| 8,350,763 B2 * | 1/2013 | Rappaport | ..................... | 343/702 |
| 2002/0113742 A1 * | 8/2002 | Bruzzone et al. | .............. | 343/757 |
| 2003/0032403 A1 * | 2/2003 | Ono | ............................... | 455/273 |
| 2003/0206132 A1 * | 11/2003 | Phelan et al. | ................. | 342/157 |

(Continued)

FOREIGN PATENT DOCUMENTS

WO WO2005/081421 9/2005 ............... H04B 1/69

OTHER PUBLICATIONS

Chen, L et al., "A Dynamic Channel Assignment Algorithm for Cellular System With Adaptive Array Antennas," May 1999, pp. 204-208.

*Primary Examiner* — Temesgh Ghebretinsae
*Assistant Examiner* — Md Talukder
(74) *Attorney, Agent, or Firm* — Allen, Dyer, Doppelt, Milbrath & Gilchrist, P.A.

(57) ABSTRACT

A wireless device belongs to a wireless communication system and exchanges information within at least one band of frequencies. A method includes detecting a presence of at least one victim device operating within the at least one band of frequencies. The first wireless device is provided with an antenna array, and the detecting step includes analyzing an environment of the wireless device through the antenna array, and if the at least one victim device is detected, reducing interference by controlling the antenna array to steer the antenna beam toward an area located outside a vicinity of the potential victim device to exchanging information within the at least one band of frequencies with at least a second wireless device located in the area.

17 Claims, 11 Drawing Sheets

(56) References Cited

U.S. PATENT DOCUMENTS

| | | | |
|---|---|---|---|
| 2005/0099353 A1* | 5/2005 | Jones et al. | 343/795 |
| 2005/0099357 A1* | 5/2005 | Durham et al. | 343/795 |
| 2005/0164655 A1* | 7/2005 | Nakao et al. | 455/101 |
| 2005/0169388 A1* | 8/2005 | Toland et al. | 375/259 |
| 2005/0277444 A1* | 12/2005 | Rensburg et al. | 455/562.1 |
| 2006/0171445 A1* | 8/2006 | Batra et al. | 375/130 |
| 2006/0193373 A1* | 8/2006 | Agee et al. | 375/141 |
| 2007/0243839 A1* | 10/2007 | Kostic | 455/132 |
| 2008/0007454 A1* | 1/2008 | Minkoff | 342/379 |
| 2008/0049672 A1* | 2/2008 | Barak et al. | 370/330 |
| 2008/0205544 A1* | 8/2008 | Berens | 375/285 |
| 2008/0297415 A1* | 12/2008 | Berens et al. | 342/372 |
| 2009/0258607 A1* | 10/2009 | Beninghaus et al. | 455/77 |
| 2011/0033000 A1* | 2/2011 | Berens et al. | 375/260 |
| 2011/0128993 A1* | 6/2011 | Chou | 375/135 |

\* cited by examiner

METHOD FOR MANAGING THE OPERATION OF A WIRELESS DEVICE, IN PARTICULAR FOR REDUCING INTERFERENCES WITH A POTENTIAL VICTIM DEVICE

FIELD OF THE INVENTION

The invention relates to wireless communication systems, and, more particularly, to the processing of interferences within different wireless communication apparatuses or devices, for example devices belonging to a UWB (Ultra Wide Band) communication system.

BACKGROUND OF THE INVENTION

The main characteristic of a UWB based wireless communication system is the fact that it operates as an underlay system in frequency bands already in use by other wireless communication and location (RADAR) systems. These incumbent systems will generate interference in the UWB systems (inband interference) and the UWB system will also generate interference toward these systems. Due to the very limited transmission power of the UWB systems, the range in which the generated interference will cause a degradation in the incumbent system is limited to meters or tenths of meters. An incumbent system operating in this area will also generate interference toward the UWB system in operation and thus leads to a degradation of the communication performance.

Orthogonal frequency-Division Multiplexing (OFDM) is a method of digital modulation in which a signal is split into several narrowband channels (sub-carriers) at different frequencies.

A WIMAX device operates, for example, with a bandwidth of 20 MHz at a central frequency of 3.5 GHz, whereas the frequency band of the MBOA system lies between 3.1 and 4.8 GHz.

Wireless personal area networks based on OFDM and UWB technologies like the MBOA standard may directly interfere to narrowband devices which are close to such wideband devices. At present, no specific interference mitigation techniques are implemented in the UWB standard based on OFDM (MBOA).

In order to avoid in-band spectral interference, a conventional method proposes to puncture, i.e. remove, selected sub-carriers. More precisely, this puncturing is made, taking into account channel knowledge, after the OFDM modulation in the transmitter, whereas a depuncturing is performed in the receiver before the OFDM demodulator.

SUMMARY OF THE INVENTION

According to an aspect, there is a method for managing the operation of a first wireless device belonging to a wireless communication system and adapted to exchange information within at least a first band of frequencies, comprising detecting the eventual presence of at least one potential victim device operating within the first band of frequencies and reducing the interferences with the at least one potential victim device.

According to a general feature of this aspect, the method further comprises providing the first wireless device with an antenna array, and the detecting step comprises analyzing on the first wireless device the environment of the wireless device through the antenna array, and if the at least one potential victim device is detected, the interference reducing step comprises controlling the antenna array for steering the antenna beam toward an area located outside of the vicinity of the potential victim device for eventually exchanging information within the first band of frequencies with at least a second wireless device located in the area.

In contrast to the conventional method, this aspect tackles the problem from the antenna side by controlling the antenna means, for example within the base band processing. In other words, adding a controllable antenna array to the wireless device, which can either be connected to a single receiving/transmitting chain in the wireless device or to several receiving/transmitting chains, permits in conjunction with the control by the base band processing, to reduce interferences with incumbent system, in the space and/or in frequency and/or in time domain(s).

According to an embodiment in which the at least one potential victim device operates within an interferer band of frequencies and the first wireless device is adapted to exchange information within a second band of frequencies excluding the interferer band of frequencies, the interference reducing step comprises controlling the first wireless device for exchanging information within the second band of frequencies with at least a third wireless device located in the vicinity of the at least one potential victim device.

According to another embodiment in which the at least one potential victim device operates within an interferer band of frequencies, the interference reducing step comprises stopping any exchange of information within a third band of frequencies including the interferer band of frequencies with at least another wireless device located in the vicinity of the potential victim device during the operation of the potential victim device.

According to another embodiment, the method further comprises providing the wireless device with several transceiving chains all connected to the antenna array, each transceiving chain being capable to individually controlling the antenna array for eventually steering its own signals toward any direction, and controlling the antenna array comprises individually controlling the antenna array through at least two different transceiving chains for simultaneously transmitting two signals having two different bands of frequencies toward respectively two selected directions. These selected directions may be the same or different.

Controlling the antenna array comprises, for example, controlling the elementary phases of all the signals going through the antennas of the array. The control may be performed through controllable elementary delay blocks respectively connected to the antennas of the antenna array, or directly within a base band processor for example.

Each wireless device may belong to an OFDM based UWB communication system or, for example, to a DS-UWB (Direct Sequence UWB) communication system.

According to one approach, it is possible, by using antenna beam forming, to provide the Detection And Avoid (DAA) principles with a spatial dimension thanks to antenna arrays integrated into the wireless devices, in particular the UWB devices. In the time domain, a UWB device can detect and avoid an incumbent service which operates on the same frequency band.

The operational band of the transmitted UWB signal, by nulling sub-carriers or switching to different sub-bands or group of sub-bands, can be adjusted in the frequency domain to protect incumbent system as well as other UWB systems operating in the near vicinity on overlapping frequency bands.

One wireless device, for example an UWB device, equipped with means or circuitry adapted to perform the above mentioned method, can operate together with devices not equipped with such means.

It is possible to reduce simultaneously the interference in the time, frequency, and space domains, while improving the UWB system throughput for a given location.

By reducing the interferences toward the incumbent system, the interferences generated by the incumbent system toward the UWB system can be also reduced. The above-mentioned method permits also the avoidance of interferences between different UWB systems. These different UWB systems might be simultaneously operating piconets of the same UWB type or UWB systems of different types, like sensor networks using low data rate UWB standards (IEEE802.15.4.a) and communication networks based on the WIMEDIA standard.

According to another aspect, a wireless device belongs to a wireless communication system and is adapted to exchange information within a first band of frequencies, the wireless device comprising an antenna array, analyzing means or circuitry adapted to analyze the environment of the wireless device through the antenna array and to detect the eventual presence of at least one potential victim device operating within the first band of frequencies, and antenna control means or circuitry adapted, upon the presence of a detected interferer, to control the antenna array for steering the antenna beam toward an area located outside of the vicinity of the potential victim device for eventually exchanging information within the first band of frequencies with at least a second wireless device located in the area.

According to an embodiment, the at least one potential victim device is adapted to operate within an interferer band of frequencies and the wireless device further comprises management means or circuitry adapted to allow an exchange of information within a second band of frequencies excluding the interferer band of frequencies with at least a third wireless device located in the vicinity of the at least one potential victim device.

According to another embodiment, the at least one potential victim device operates within an interferer band of frequencies and the wireless device comprises management means or circuitry adapted to stop any exchange of information within a third band of frequencies including the interferer band of frequencies with at least another wireless device located in the vicinity of the potential victim device during the operation of the potential victim device.

According to another embodiment, the wireless device may further comprise several transceiving chains all connected to the antenna array, and the antenna control means or circuitry comprises several elementary antenna control means or circuitry at least partially included within the transceiving chains and adapted to individually control the antenna array for eventually steering a signal going through a transceiver chain toward any direction, and at least two elementary antenna control means or circuitry are adapted to individually control the antenna array through for simultaneously transmitting two signals having two different bands of frequencies toward two respectively selected directions.

BRIEF DESCRIPTION OF THE DRAWINGS

Other advantages and features of the invention will appear on examining the detailed description of embodiments, these being in no way limiting, and of the appended drawings in which.

DETAILED DESCRIPTION OF THE PREFERRED EMBODIMENTS

A non-limiting application of the invention is directed to devices operating according to the Ultra Wide Band (UWB) standard based on OFDM (Orthogonal Frequency-Division Multiplexing), called MBOA (Multiband OFDM Alliance), which can generate interferences toward an incumbent device like a WIMAX device (Worldwide Interoperability for Microwave Access), which is a fixed wireless device, or toward a mobile radio device.

Figure 1:
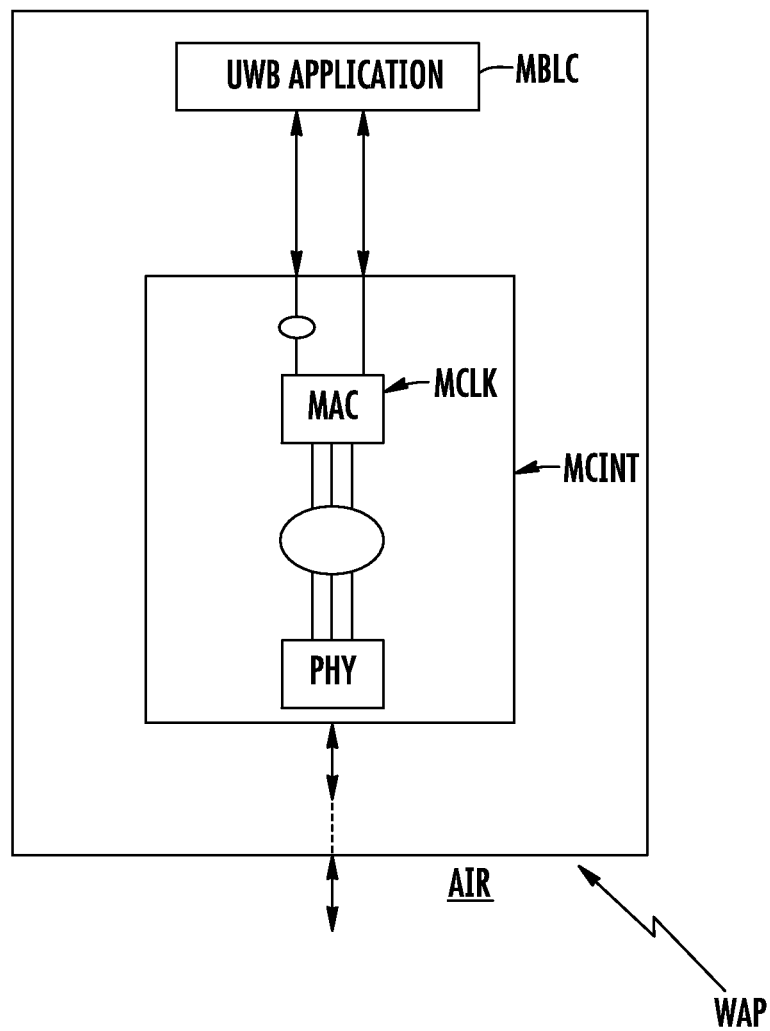
FIG. 1 illustrates diagrammatically an embodiment of an UWB device, in accordance with the prior art.

FIG. 1 discloses an example of a wireless communication device WAP1 belonging to a non-coordinated communication system such as a WLAN ("Wireless Local Area Network") or a WPAN ("Wireless Personal Area Network").

Such a wireless device WAP1 belongs, for example, to an OFDM based Ultra Wide Band Communication system. However, the approach is not limited to such an example and can apply also, for example, to coordinated wireless systems like mobile radio systems or WIMAX systems or a WLAN in coordinated mode using an access point, and more generally to any kind of wireless systems such as CDMA, GSM systems, or generalised multi-carrier (GMC) systems in which the carriers are not necessarily orthogonal.

WPAN MAC protocols have a distributed nature where there is no central coordinator terminal or base station to assign the medium access. There, in contrast to a mobile radio terminal, a WPAN transceiver has much higher flexibility to allocate the transmission slot and formats. The allocation of the communication resources is a distributed process. The allocation to a specific time slot in the super frame can be modified from one superframe to the next. The controlling entity is the WPAN-MAC layer of the communicating terminals. The allocation is based on the requested data rate and the type of service to be transmitted. Furthermore, the available resources are taken into account in the allocation process. The MAC layer requests a reservation for a specific time slot or a number of time slots based on these constraints. These constraints can be split into local constraints, like the data rate to be transmitted or received, and network wide constraints like the already existing slot reservation. An example of distributed WPAN-MAC is MBOA MAC.

The proposed MBOA MAC standard draft is based on a UWB technology and is planed to be used in the frequency band between 3.1 and 10.7 GHz. First implementations using the standard work in the frequency range between 3.1 GHz and 5.0 GHz.

The wireless device WAP1 comprises conventionally an OFDM based UWB communication interface MCINT connected between an UWB application block MBLC and the air channel.

This communication interface comprises an UWB MAC layer clocked by a clock signal MCLK and connected to a PHY layer and to the UWB application block.

For further details concerning the MAC layer and the PHY layer of the communication interface, one skilled in the art may refer to the High Rate Ultra Wideband PHY and MAC Standard, Standard ECMA-368, $1^{st}$ edition, December 2005, and to the MAC-PHY Interface for ECMA-368, Standard ECMA-369, $1^{st}$ edition, December 2005.

Figure 2:
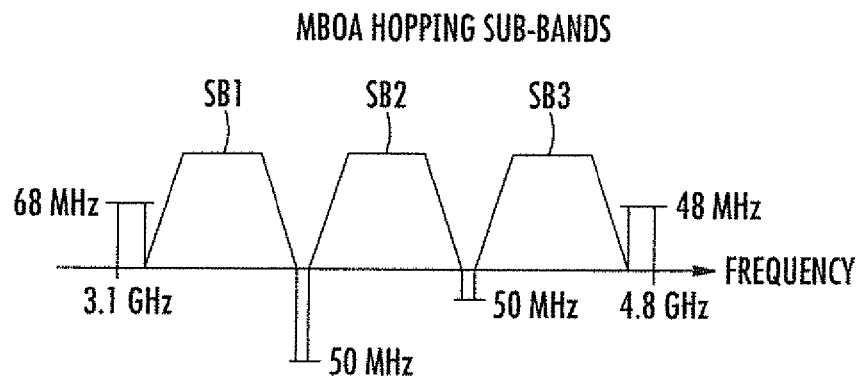
FIG. 2 illustrates diagrammatically MBOA hopping subbands, in accordance with the prior art.

The MAC layer manages in particular the emission/reception of the UWB data stream and is incorporated by software in a control processor BB. In FIG. 2 it can be seen that a band of frequencies used for the operation (transmission and/or reception) of the device WAP lies between 3.1 GHz and 4.8 GHz. Further, the frequency band is subdivided into three sub-bands SB1, SB2, SB3, called hopping sub-bands, which are mutually spaced. More precisely, there is a guard interval of 68 MHz between the lower limit (3.1 GHz) of the frequency band and the beginning of the first sub-band SB1, as well as a guard interval of 48 MHz between the end of the third sub-band SB3 and the upper limit (4.8 GHz) of the frequency band.

Figure 3:
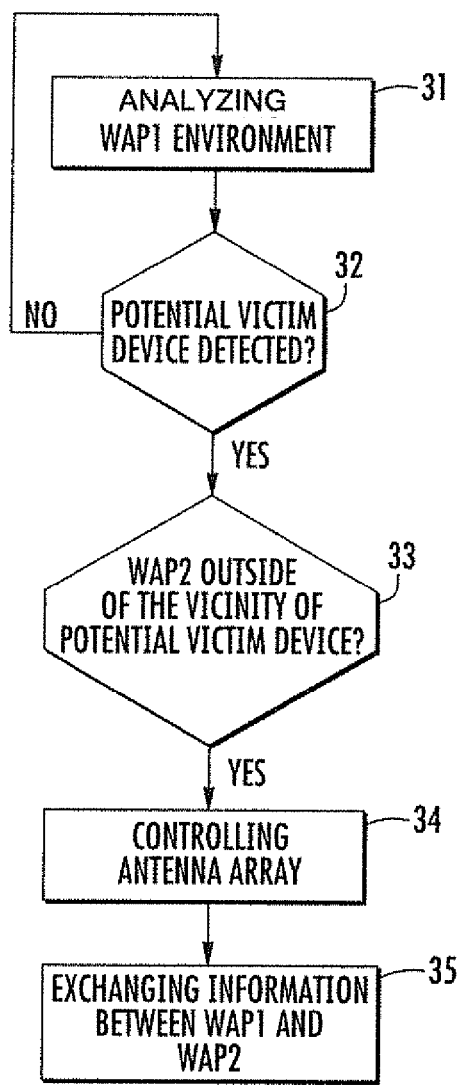
FIGS. 3 and 4 illustrate diagrammatically an embodiment of a method and a device permitting a spatial interference avoidance, according to the present invention.
Figure 4:
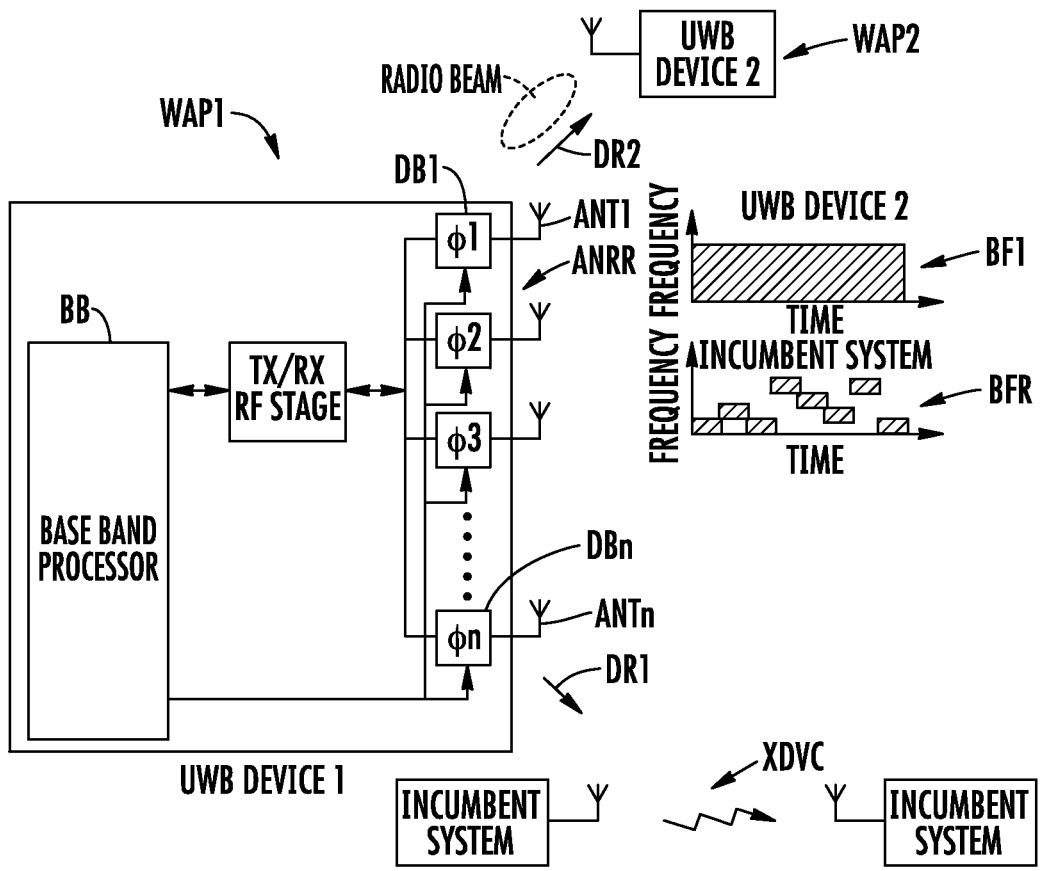

Further, two adjacent sub-bands are spaced by a guard interval of 50 MHz. The allocation of the sub-bands during the transmission is made according to a predetermined hopping sequence. Referring now more particularly to FIGS. 3 and 4, it can be seen that the UWB device WAP1 is provided with an antenna array ANNR including here n antennas. Each antenna is connected in the present example to the base band processor BB through controllable delay blocks DB1-DBn, and, through a common transmitting radio frequency stage and a common radio frequency receiving stage RF. However, as it will be seen more in detail thereafter, other architectures are possible.

The delay blocks are controlled by the base-band processor in conjunction with the control of the used operational band in time and/or frequency and/or space. While turning on, the UWB device WAP1 monitors the environment to see where other systems are located and on which frequency they operate. Then, the antenna beam is steered to reduce interference with incumbent systems operating on the same frequency as that of the UWB device.

FIGS. 3 and 4 depict more particularly an example of a spatial avoidance technique.

The UWB device WAP1 operates in a first frequency band BF1 which can be, for example, one of the three sub-bands of the MBOA sub-bands pattern. In step 31 (FIG. 3) the UWB device WAP1 analyzes its environment in order to detect the eventual presence of a potential victim device XDVC or incumbent system (step 32).

Many kinds of potential victim devices or incumbent systems are possible, for example a narrow band device adapted to operate in an interferer frequency band having, for example, a width of 20 MGHz. Compared to a UWB device based on techniques like MBOA standards, such an interferer XDVC is considered as being a narrow band device.

As an example, a 20 MHz narrow band carrier, which can be the width of the band of the interfering device, corresponds to only 1.3% of the used UWB spectrum of a MBOA based device and corresponds, for example, to an interfering sub-carrier group of 5 or 7 sub-carriers.

The interferer may belong to a fixed wireless access system (FWA) like a WIMAX system. However, it is also possible that a potential victim device belongs to a mobile radio system defined by a mobile radio standard like, for example, UMTS, GSM, CDMA, EDGE, beyond IMT-2000 systems, or to a fixed satellite system (FSS), or to a radar system used in radionavigation if the frequency band of the mobile radio system or the satellite system or the radar system is located within the frequency band of the device WAP1.

In the present case, as illustrated in FIG. 4, an incumbent system XDVC has been detected in direction DR1. The incumbent system operates in an interferer band of frequencies BFR included within the first band of frequencies BF1.

Another UWB device WAP2 operating within the first band of frequencies BF1 has been also detected toward direction DR2. The UWB device WAP2 is accordingly in an area outside of the vicinity of the interferer (step 23). Thus, the antenna array ARRN is controlled (step 34) in order to steer the antenna beam toward the UWB device WAP2 for exchanging information within the first band of frequencies BF1.

Therefore, both UWB devices WAP1, WAP2 and the incumbent system XDVC can operate in overlapping frequency bands since they are separated in the spatial domain.

For simplicity reasons, only UWB device WAP1 has been represented more in details. UWB device WAP2 might have, in fact, an identical internal structure like the device WAP1. Device WAP2 can also be a much simpler device without antenna array. Thus, a simple backward compatibility can be achieved. In other words, the wireless devices embodying some aspects of the approach can operate in an environment with wireless devices not deploying such aspects.

Figure 5:
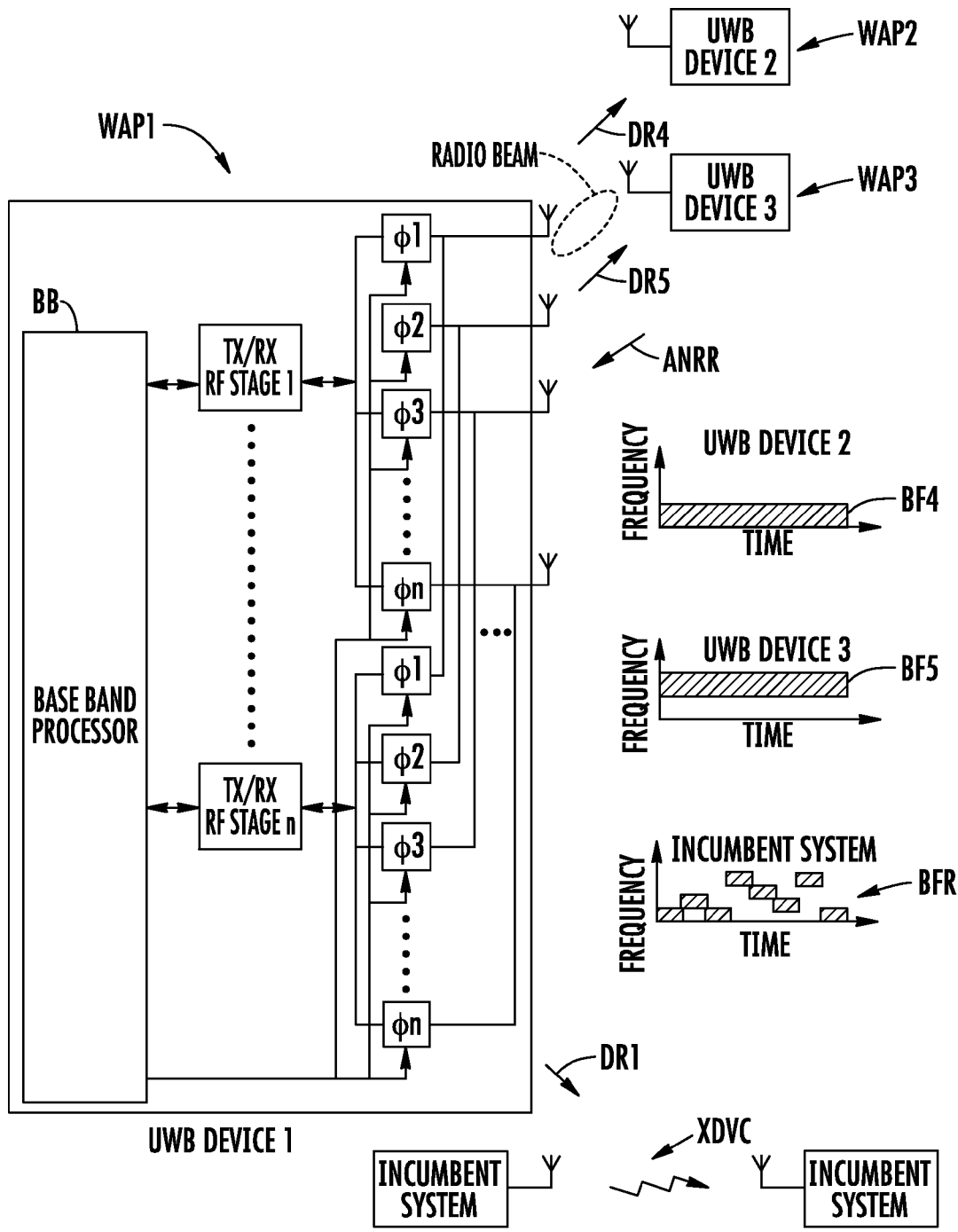
FIGS. 5 and 6 illustrate diagrammatically an embodiment of a method and a device permitting a frequency managing operation together with a spatial interference avoidance, according to the present invention.

The features described above can be extended to a wireless device provided with n radio chains as depicted in FIG. 5. These transceiving radio chains are connected to the same antenna array ARRN. Each radio chain has it own phase control system so that n frequency bands can be simultaneously emitted and steered toward different directions.

In other words, by parallelizing n transceiving chains all connected to the same antenna array, each of these transceiving chains having the control of the phase of the signal going through each antenna via base band processor BB, each transmitter can steer its own signal into a wanted direction. Thus, by individually controlling the antenna array through at least two different transceiving chains, it is possible to simultaneously transmit two signals having two different bands of frequencies toward two respectively selected directions. Of course, the selected directions may be the same or different.

Figure 6:
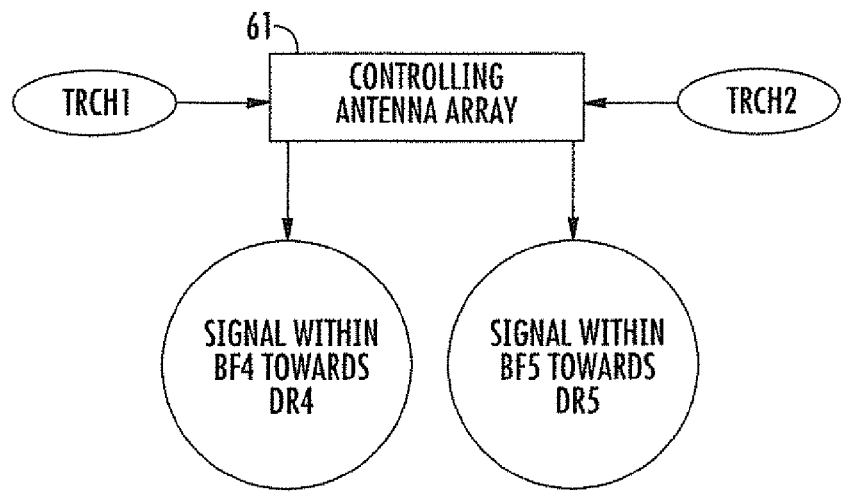

In the example illustrated in FIG. 5, an incumbent system operating within the interferer frequency band BFR has been detected in direction DR1. Thus, as illustrated in FIG. 6, the antenna array ARRN is controlled (step 61) through a first transmission chain TRCH1 to steer the signal toward direction DR4, and antenna array is also controlled through a second transceiving chain TRCH2 to steer the radio beam toward direction DR5, which is here the same as direction DR4.

Thus, information can be simultaneously exchanged between device WAP1 and devices WAP2, WAP3 which are both located outside of the vicinity of the incumbent system XDVC. Device WAP2 operates within a frequency band BF4 whereas device WAP3 operates within a frequency band BF5. Both frequency bands BF4 and BF5 are, for example, different sub-bands of the MBOA sub-bands pattern.

Figure 7:
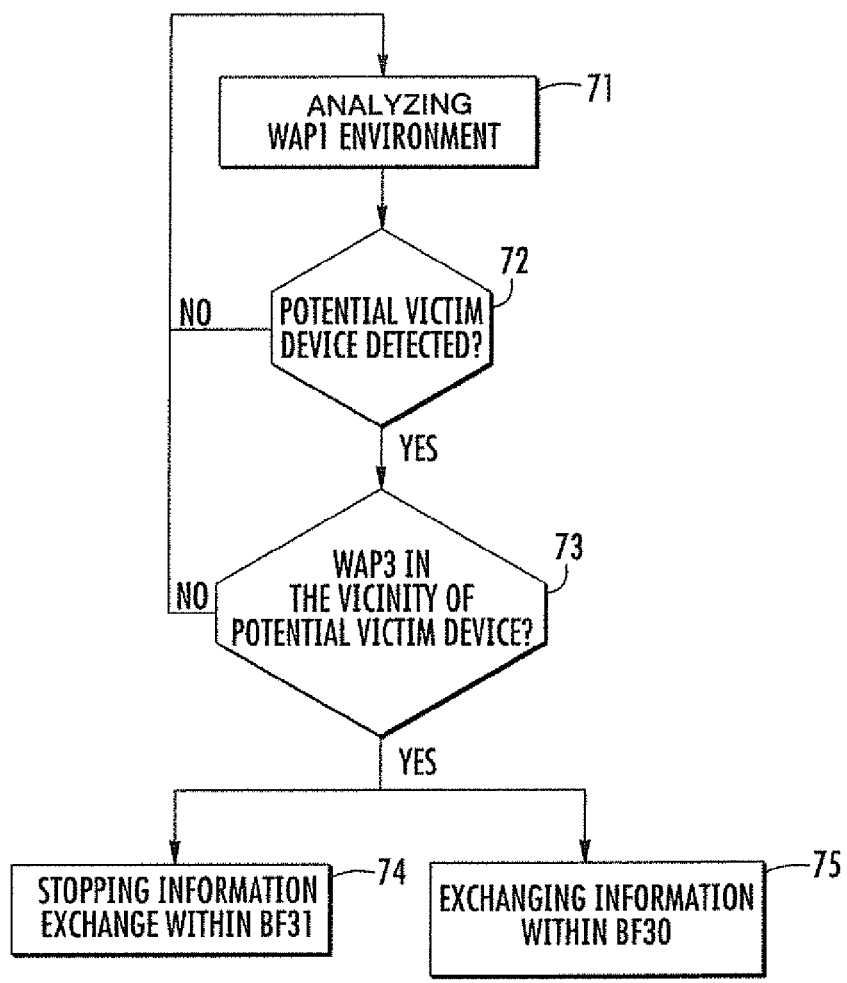
FIGS. 7 and 8 illustrate diagrammatically an embodiment of a method and a device permitting a time, frequency and spatial interference avoidance.
Figure 8:
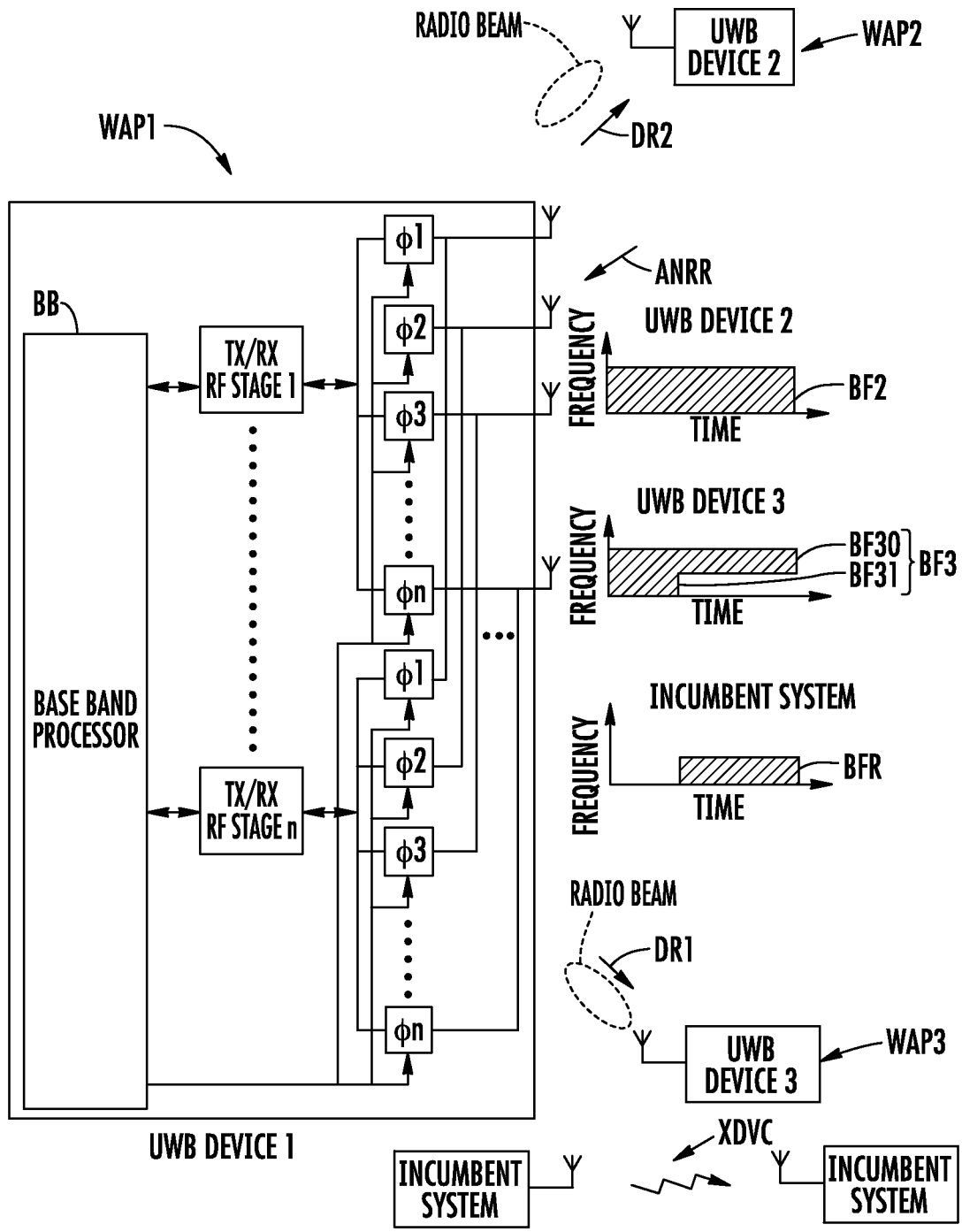

In the example illustrated in FIG. 8, the WAP1 device's environment analysis 71 (FIG. 7) reveals the presence in the direction DR2 of a wireless device WAP2, operating within frequency band BF2, and a wireless device WAP3 in the direction DR1 operating within frequency band BF3. However, at an instant of time, an incumbent system XDVC is also detected in direction DR1 operating within frequency band BFR.

Figure 9:
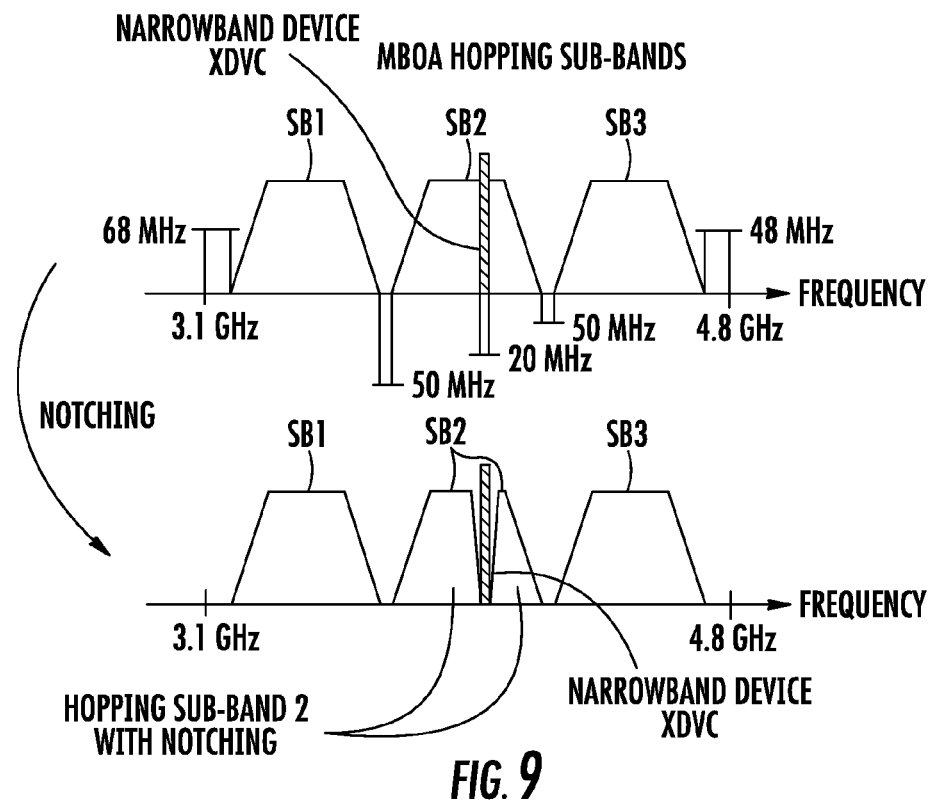
FIG. 9 illustrates diagrammatically MBOA hopping subbands with notching, according to the present invention.

In the present example, as illustrated in FIG. 9, the interferer XDVC is a narrow band device operating within the second sub-band SB2 of the MBOA hopping sub-bands, and for example, frequency band BF3 is the second sub-band SB2.

As the wireless device WAP3 is in the vicinity of the interferer XDVC, an approach may be found in order to reduce the interferences with the incumbent system XDVC.

A possible approach is for devices WAP1 and devices WAP3 to exchange information within a band of frequencies BF30 excluding the interferer frequency band BFR (step 75).

In this respect, and as illustrated in FIG. 9, an approach includes, for example, notching the second sub-band SB2 in order to obtain a notched sub-band corresponding to the frequency band BF30 which does not include the interferer band BFR.

Such a notching process is, for example, disclosed in European patent application 1,739,708 in the name of applicant, and which is incorporated here by reference.

Figure 10:
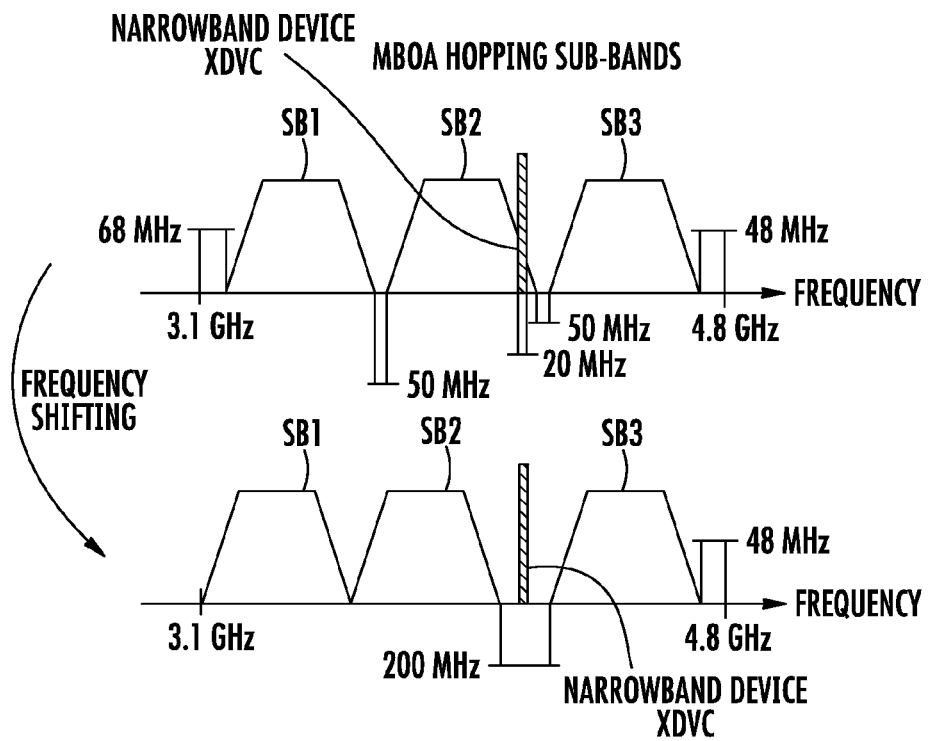
FIG. 10 illustrates diagrammatically MBOA hopping subbands with frequency shifting, according to the present invention.

Another possible approach includes performing a frequency shifting of the sub-band SB2, as illustrated in FIG. 10, in order to obtain a shifted sub-band which does not include the interferer frequency band BFR. Such a shifting process is also disclosed, for example, in EP 1,739,908.

Another possible approach includes stopping (step 74, FIG. 7) information exchange between device WAP1 and device WAP3 within the frequency band BF31 or within frequency band BF3 which includes the interferer frequency band BFR.

Of course, because the UWB device WAP2 is located in the direction DR2, i.e. outside of the vicinity of the incumbent system XDVC, UWB device WAP1 exchanges information with UWB device WAP2 without any interference, although there is a frequency overlapping between frequency band BF2 and interferer frequency band BFR.

The wireless device WAP1 comprises a transmission chain TXCH and a reception chain RXCH (FIGS. 11 to 14). Both chains are connected to the several different antennas ANTI-ANTn of the antenna array ANBR through controllable delay blocks db1-dbn, which permits delaying the signal by a constant in order to modify the phases $\phi 1$-$\phi n$ of the corresponding signals.

The transmission chain TXCH comprises an encoder CC, for example a convolutional encoder, receiving data from source coding means or circuitry and delivering a bit stream to puncturing means or circuitry PM which delivers a punctured bit stream.

The other means or circuitry of the transmission chain are interleaving means or circuitry ILM, followed by mapping means or circuitry MPM which map the bits into symbols according to a modulation mapping scheme depending on the kind of used modulation, for example, a BPSK modulation or more generally a QAM modulation. The symbols are then delivered to an OFDM modulator OFM which performs IFFT processing in order to associate each symbol to a sub-carrier and to form OFDM symbols. Each sub-carrier is modulated in accordance with the value of the corresponding symbol.

The OFDM symbols delivered by the base band control processor BB are then processed in a conventional radio frequency stage RF before being transmitted on air through the antenna array ANRR.

The reception chain RXCH comprises means or circuitry corresponding to the means or circuitry of the transmission chain for performing inverse operations with respect to the operations performed by the means of the transmission chain.

The reception chain RXCH includes a receiving stage for receiving information carried by the sub-carriers and delivering received symbols from the received information. The receiving stage includes, in particular, a radio frequency stage RF connected to the antenna array followed by a OFDM demodulator DOFM (FFT processing).

The reception chain contains also equalization means or circuitry EQ followed by demapping means or circuitry DMPM for demapping the received symbols according to the modulation scheme and delivering a punctured stream of soft bits to deinterleaver means or circuitry DILM.

A soft bit, for example a Log-Likelihood Ratio LLR, well-known by one skilled in the art, has a sign representative of the estimation of the logical value (0 or 1) of the corresponding bit and a magnitude representative of the confidence in the estimation. Thus, a soft bit, which is coded on several hard bits, may have theoretically a value between $-\infty$ and $+\infty$. And, the higher the magnitude is, the higher the confidence in the estimation is.

Figure 11:
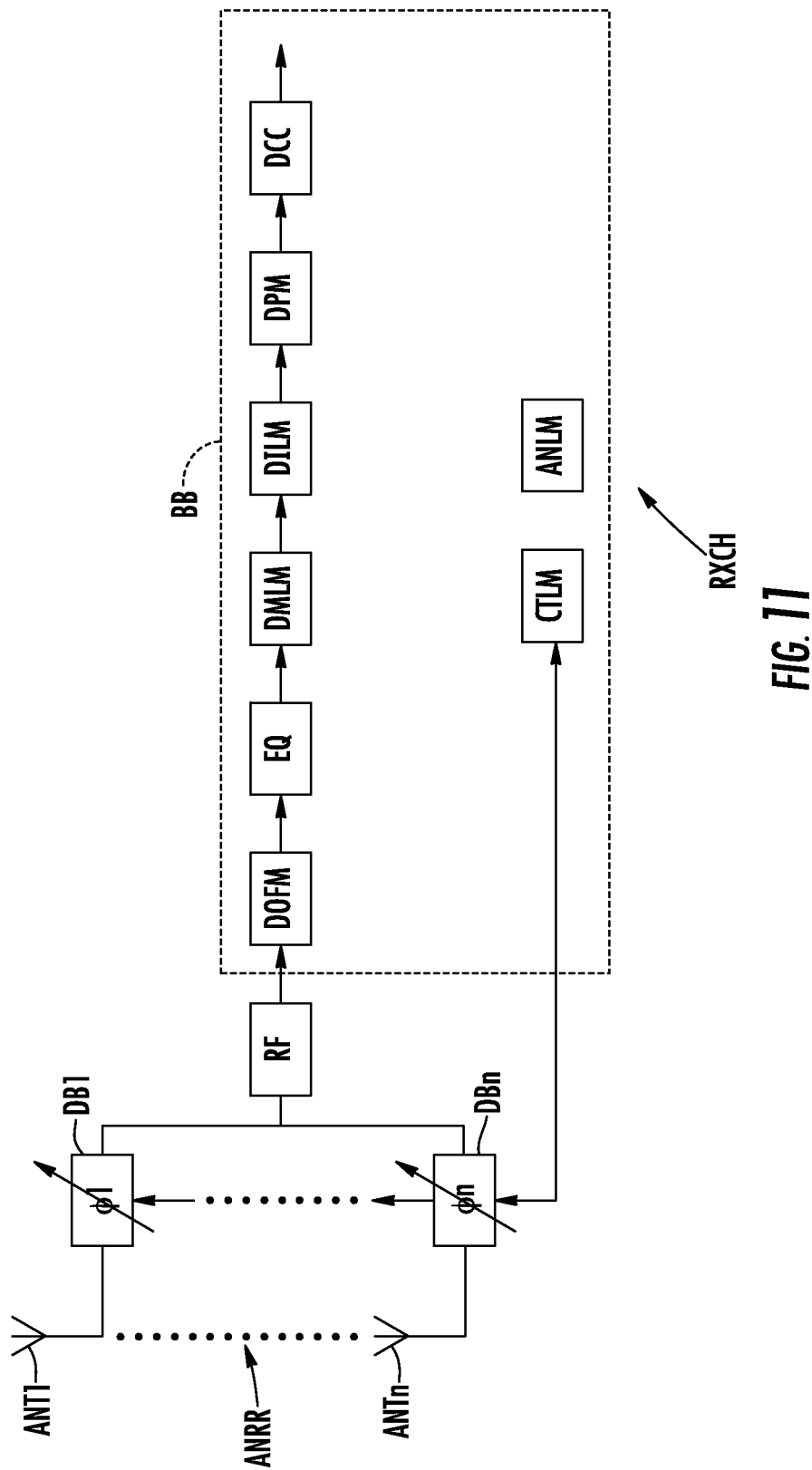
FIGS. 11 and 12 illustrate diagrammatically but more in details an embodiment of the device of FIG. 10, and FIGS. 13 and 14 illustrate diagrammatically another embodiment of a receiving and transmitting chain of the device of FIG. 10.
Figure 12:
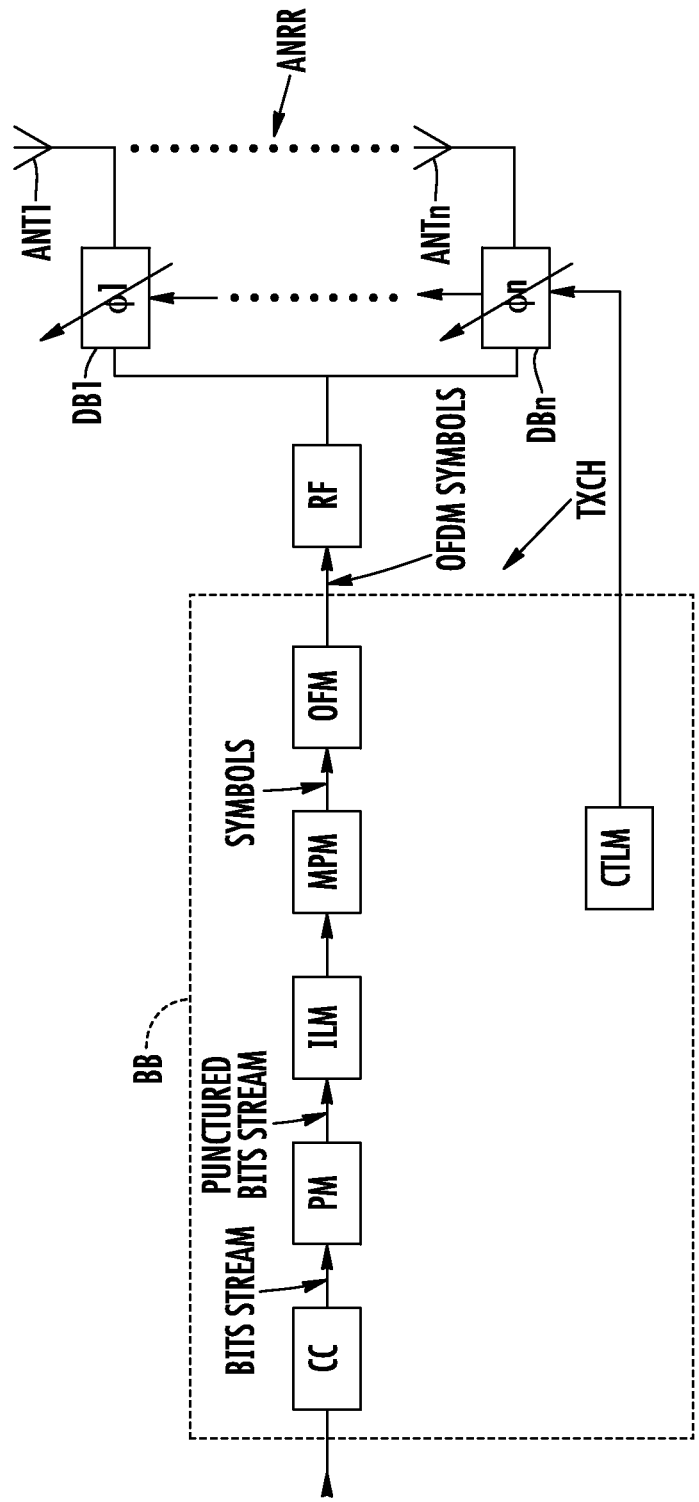

After depuncturing in depuncturing means or circuitry DPM, the bits are decoded in a decoder DCC. In FIGS. 11 and 12, there is a common RF stage connected between the antenna array and the several delay blocks DB1-DBn. The base band processor BB further comprises antenna control means or circuitry CTLM adapted to adjust the phases of the different signals going through the antennas of the antenna array.

As the antennas are omni directional antennas, it is possible by conventionally adjusting the different phases $\phi i$, to steer the antenna beam toward n directions in order to scan n sectors of the space.

Further to this antenna control means or circuitry CTLM, which can be, for example, realized by a software module within the base band processor, the device WAP1 comprises analyzing means or circuitry ALNM adapted to analyze the environment of the wireless device through the antenna array ARNN and to detect the eventual presence of at least one potential victim device operating within a given band of frequencies.

The analyzing means or circuitry ALNM may be also incorporated in the base band processor and realized, for example, by a software module.

For example, the analyzing means or circuitry can be implemented using the FFT (Fast Fourier Transform) means or circuitry available in the UWB device.

Several known and conventional approaches are possible for detecting such an eventual interferer. One approach includes evaluating the SNRs on the different sub-carriers and, based on a comparison between the average values with the peak values, interfered carriers can be identified.

Another approach could include measuring the energy on all the sub-carriers, then averaging this energy and then detecting whether or not the energy of one or several sub-carriers exceeds a threshold above this mean value. Another approach could be based on the estimation of the variance of the channel estimation.

After having analyzed the environment of the WAP1 device, this device can adjust the direction of the antenna beam in order to avoid interferences with an incumbent system, by controlling the delay blocks DB1-DBn through the antenna control means or circuitry CTLM.

Figure 13:
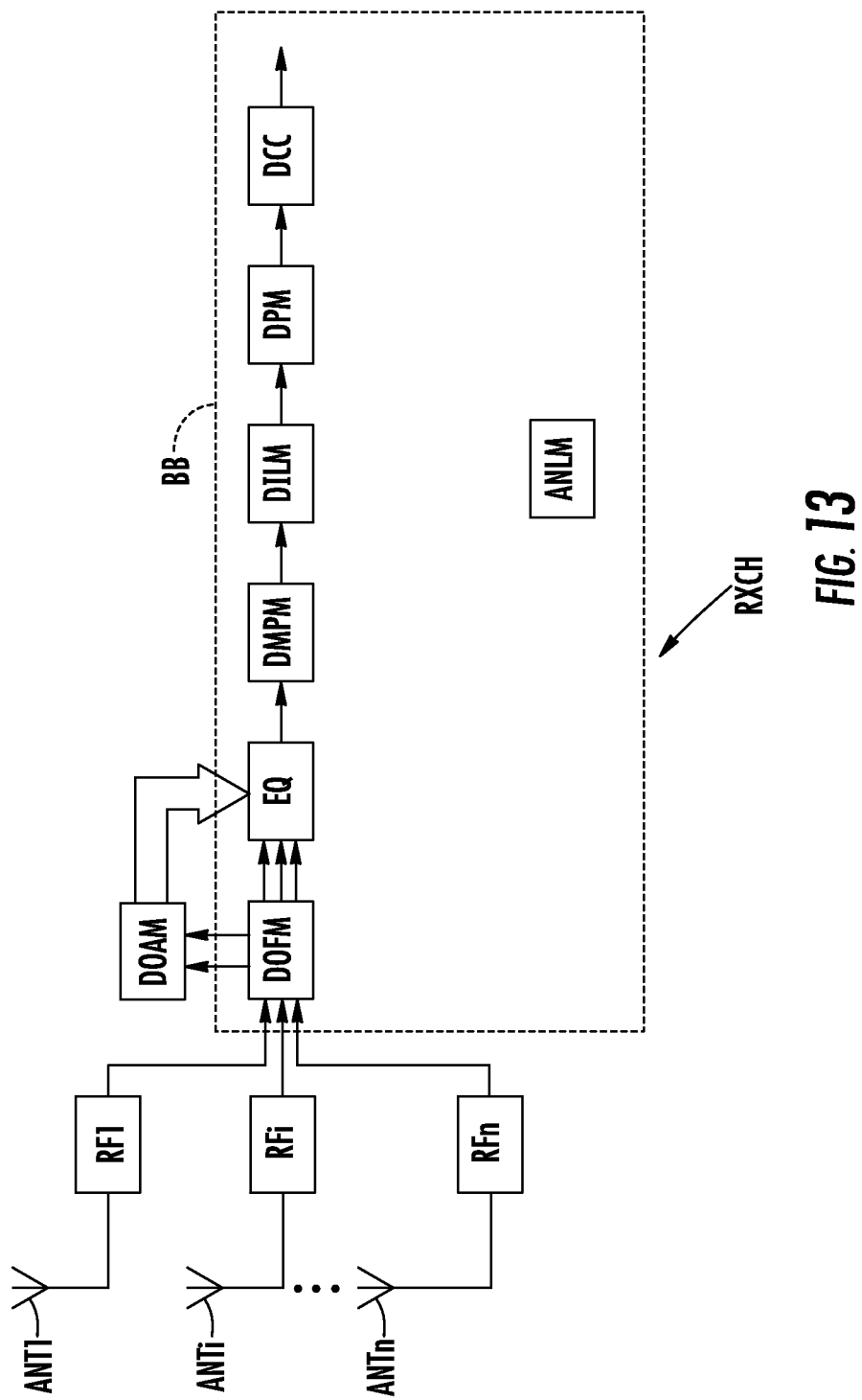
Figure 14:
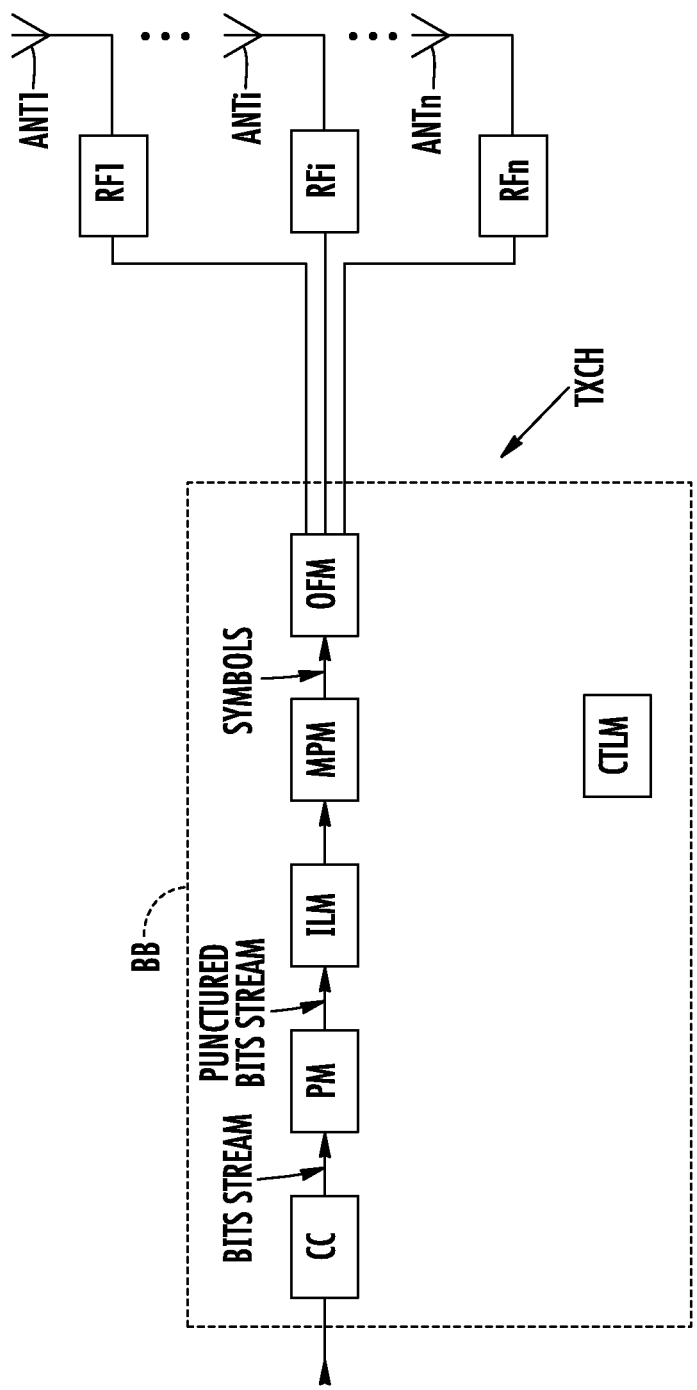

In the embodiments illustrated in FIGS. 13 and 14, there is one RF stage associated to each antenna of the antenna array.

The device WAP1 further comprises means or circuitry DOAM adapted to determine the direction of arrivals (DoA) of other eventual signals emitted from eventual other devices located in the environment of the device WAP1.

Such means or circuitry DOAM may be, for example, means implementing a well-known ESPRIT or MUSIC algorithm.

Many papers, books and or presentations exist on the well-known ESPRIT or MUSIC algorithm, for example:
- Advanced Algorithm for Smart Antennas, A. Gershman April 2005, available at http://www.nas.tu-darmstadt.de/lectures/Smart_Ant_Part1.pdf
- A new approach to array interpolation by generation of artificial shift invariances: interpolated ESPRIT, M. Bühren et al, available at http://www.lss.uni-stuttgart.de/forschung/buehren-icassp2003.pdf
- Effects of Multipath-Induced Angular Spread on Direction of Arrival Estimators in Array Signal Processing, R. Moses and al, available at http://www.ece.osu.edu/~randy/publications/RLMconf/C45.pdf
- Other publications can be found at http://www.nas.tu-darmstadt.de/lectures/APpapers.html The means or circuitry DOAM deliver to the equalization means or circuitry EQ a spatial energy distribution information which may permit the base band processor to analyze the several directions in order to detect the presence of an eventual interferer, as explained for example above.

Depending on the result of the analysis, the antenna control means or circuitry located within the base band processor may then directly determine in the base band, the several phases of the several signals to be transmitted through the antennas ANTi in order to steer the radio beam in the desired direction.

Management means or circuitry adapted to stop any exchange of information within a given frequency band or to allow such an exchange within another given frequency band may be also incorporated in the UWB device, for example by a software module in the MAC layer.

Of course, the possible architecture illustrated in FIGS. 11 to 14, are available for each transceiving chain of the wireless device WAP1, if this device is provided with several different transceiving chains.

That which is claimed is:

1. A method of managing operation of a first Ultra Wideband (UWB) wireless device belonging to a wireless UWB communication system and adapted to exchange information within at least a first band of frequencies, the method comprising:
    detecting a presence of at least one potential victim device operating within the first band of frequencies and reducing the interference with the at least one potential victim device;
    providing the first UWB wireless device with an antenna array;
    providing the first UWB wireless device with a plurality of transceiving chains coupled to the antenna array, with each transceiving chain being able to individually control the antenna array for steering its own signals toward a direction;
    the detecting comprising analyzing on the first UWB wireless device an environment of the first UWB wireless device using the antenna array; and
    if the at least one potential victim device is detected, the interference reducing comprising controlling the antenna array for steering an antenna beam toward an area located outside a vicinity of the at least one potential victim device for exchanging information within the first band of frequencies with at least one second UWB wireless device located in the area, and with the antenna array being controlled through at least two of the plurality of transceiver chains for simultaneously transmitting two signals having two different bands of frequencies in two respectively selected directions.

2. A method according to claim 1, wherein the first band of frequencies includes an interferer band of frequencies; and wherein the at least one potential victim device operates within the interferer band of frequencies; and wherein the first UWB wireless device is further adapted to exchange information within a second band of frequencies excluding the interferer band of frequencies; and wherein the reducing further comprises controlling the first UWB wireless device for exchanging information within the second band of frequencies with at least one third UWB wireless device located in the vicinity of the at least one potential victim device.

3. A method according to claim 2, wherein the at least one potential victim device operates within the interferer band of frequencies; and wherein the reducing further comprises stopping an exchange of information within a third band of frequencies including the interferer band of frequencies with the at least one third UWB wireless device located in the vicinity of the at least one potential victim device during operation of the at least one potential victim device.

4. A method according to claim 1, wherein controlling the antenna array comprises controlling elementary phases of signals in antennas of the antenna array.

5. A method according to claim 1, wherein the UWB communication system comprises a multi-carrier based UWB communication system.

6. A method according to claim 1, wherein the UWB communication system comprises a DS-UWB communication system.

7. A method of managing operation of a first Ultra Wideband (UWB) wireless device adapted to exchange information within at least a first band of frequencies including an interferer band of frequencies, the method comprising:
    detecting a presence of at least one potential victim device operating within the interferer band of frequencies and reducing the interference with the at least one potential victim device;
    the detecting comprising analyzing on the first UWB wireless device an environment of the first UWB wireless device using an antenna array, with the first UWB wireless device comprising a plurality of transceiving chains coupled to the antenna array, with each transceiving chain being able to individually control the antenna array for steering its own signals toward a direction; and
    if the at least one potential victim device is detected, the interference reducing comprising controlling the antenna array for steering an antenna beam toward an area located outside a vicinity of the at least one potential victim device for exchanging information within the first band of frequencies with at least one second UWB wireless device located in the area and controlling the first UWB wireless device for exchanging information within a second band of frequencies excluding the interferer band of frequencies with at least one third UWB wireless device located in the vicinity of the at least one potential victim device, and with the antenna array being controlled through at least two of the plurality of transceiver chains for simultaneously transmitting two signals respectively having the first and second bands of frequencies.

8. A method according to claim 7, wherein controlling the antenna array comprises controlling elementary phases of signals in antennas of the antenna array.

9. A method according to claim 7, wherein each wireless UWB device belongs to a multi-carrier based UWB communication system.

10. A method according to claim 1, wherein each wireless UWB devices belongs to a Direct Sequence Ultra Wideband (DS-UWB) communication system.

11. A wireless Ultra Wideband (UWB) communication device adapted to exchange information within a first band of frequencies and comprising:
an antenna array;
analyzing circuitry using said antenna array to detect a presence of at least one potential victim device operating within the first band of frequencies;
a plurality of transceiving chains coupled to said antenna array, with each transceiving chain being able to individually control said antenna array for steering its own signals toward a direction; and
antenna control circuitry to control the antenna array for steering an antenna beam toward an area located outside of a vicinity of the at least one potential victim device for exchanging information within the first band of frequencies with at least one second wireless device located in the area, and with said antenna array being controlled through at least two of said plurality of transceiver chains for simultaneously transmitting two signals having two different bands of frequencies in two respectively selected directions.

12. A wireless UWB communication device according to claim 11, wherein the first band of frequencies includes an interferer band of frequencies; and wherein the at least one potential victim device is adapted to operate within the interferer band of frequencies; and wherein said wireless device further comprises management circuitry adapted to allow an exchange of information within a second band of frequencies excluding the interferer band of frequencies with at least one third wireless device located in a vicinity of the at least victim device.

13. A wireless UWB communication device according to claim 12, wherein said wireless device further comprises management circuitry adapted to stop an exchange of information within a third band of frequencies including the interferer band of frequencies with at least a third wireless device located in a vicinity of the at least one potential victim device during operation of the at least one potential victim device.

14. A wireless UWB communication device according to claim 13, wherein said antenna control circuitry comprises a plurality of elementary antenna control circuits at least partially included within the plurality of transceiving chains and adapted to individually control said antenna array for steering signals going through least one of said plurality of transceiving chains in a direction, and at least two elementary antenna control circuits adapted to individually control said antenna array for simultaneously transmitting the two signals having two different bands of frequencies toward the two respectively selected directions.

15. A wireless UWB communication device according to claim 11, wherein said antenna control circuit comprises controllable elementary delay blocks respectively coupled to at least one antenna of said antenna array.

16. A wireless UWB communication device according to claim 11, wherein the UWB wireless communication device belongs to a multi-carrier based UWB communication system.

17. A wireless UWB communication device according to claim 11, wherein the wireless UWB communication device belongs to a Direct Sequence Ultra Wideband (DS-UWB) communication system.

* * * * *

UNITED STATES PATENT AND TRADEMARK OFFICE
CERTIFICATE OF CORRECTION

| | | |
|---|---|---|
| PATENT NO. | : 8,774,728 B2 | Page 1 of 1 |
| APPLICATION NO. | : 12/128716 | |
| DATED | : July 8, 2014 | |
| INVENTOR(S) | : Berens et al. | |

It is certified that error appears in the above-identified patent and that said Letters Patent is hereby corrected as shown below:

In the Claims,

Column 11, Line 11    Delete: "devices belongs"
                      Insert: --device belongs--

Column 12, Line 5     Delete: "at least victim"
                      Insert: --at least one victim--

Signed and Sealed this
Thirtieth Day of June, 2015

Michelle K. Lee
*Director of the United States Patent and Trademark Office*